(12) United States Patent
Levy et al.

(10) Patent No.: US 10,412,673 B2
(45) Date of Patent: Sep. 10, 2019

(54) POWER-EFFICIENT ACTIVATION OF MULTI-LANE PORTS IN A NETWORK ELEMENT

(71) Applicant: MELLANOX TECHNOLOGIES TLV LTD., Ra'anana (IL)

(72) Inventors: Gil Levy, Hod Hasharon (IL); Liron Mula, Ramat Gan (IL); Aviv Kfir, Nili (IL); Lavi Koch, Tel Aviv (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 61 days.

(21) Appl. No.: 15/607,494

(22) Filed: May 28, 2017

(65) Prior Publication Data

US 2018/0343613 A1   Nov. 29, 2018

(51) Int. Cl.
| | |
|---|---|
| *G06F 1/32* | (2019.01) |
| *H04W 52/02* | (2009.01) |
| *G06F 1/3206* | (2019.01) |
| *G06F 1/3234* | (2019.01) |
| *G06F 1/3203* | (2019.01) |

(52) U.S. Cl.
CPC ...... *H04W 52/0222* (2013.01); *G06F 1/3206* (2013.01); *G06F 1/3234* (2013.01); *G06F 1/3203* (2013.01); *H04W 52/0206* (2013.01)

(58) Field of Classification Search
CPC .......... H04W 52/0222; H04W 52/0206; G06F 1/3206; G06F 1/3234
USPC ....................................................... 713/320
See application file for complete search history.

(56) References Cited

U.S. PATENT DOCUMENTS

| | | | |
|---|---|---|---|
| 6,366,589 B1 | 4/2002 | Naudus, Jr. et al. | |
| 6,442,174 B1 | 8/2002 | Lin | |
| 6,748,475 B1* | 6/2004 | Sørensen | G06F 13/385 370/463 |
| 6,791,942 B2 | 9/2004 | Jin | |
| 6,947,776 B2 | 9/2005 | Vollmer et al. | |
| 7,110,394 B1 | 9/2006 | Chamdani et al. | |
| 7,136,953 B1 | 11/2006 | Bisson et al. | |

(Continued)

OTHER PUBLICATIONS

Irwing, R., "An Efficient Algorithm for the "Stable Roommates" Problem", Journal of Algorithms, vol. 6, issue 4, pp. 577-595, Dec. 1985.

(Continued)

*Primary Examiner* — Volvick Derose
(74) *Attorney, Agent, or Firm* — Kligler & Associates

(57) ABSTRACT

A network element includes circuitry and multiple ports. The ports are configured to transmit packets to a common destination via multiple paths of a communication network. Each port includes multiple serializers that serially transmit the packets over respective physical lanes. The power consumed by each port is a nonlinear function of the number of serializers activated in the port. The circuitry is configured to select one or more serializers among the ports to (i) meet a throughput demand via the ports and (ii) minimize an overall power consumed by the ports under a constraint of the nonlinear function, and to activate only the selected serializers. The circuitry is configured to choose for a packet received in the network element and destined to the common destination a port in which at least one of the serializers is activated, and to transmit the packet to the common destination via the chosen port.

22 Claims, 3 Drawing Sheets

(56) References Cited

U.S. PATENT DOCUMENTS

| | | | |
|---|---|---|---|
| 7,197,591 | B2 | 3/2007 | Kwa et al. |
| 7,313,712 | B2 | 12/2007 | Cherukuri et al. |
| 7,389,046 | B1 | 6/2008 | Tanaka et al. |
| 7,480,808 | B2 | 1/2009 | Caruk et al. |
| 7,584,375 | B2 | 9/2009 | Gutman et al. |
| 7,599,284 | B1 | 10/2009 | Di Benedetto et al. |
| 7,848,264 | B1 | 12/2010 | Gai et al. |
| 8,000,336 | B2 | 8/2011 | Harel |
| 8,219,835 | B1 * | 7/2012 | Uhlhorn ............... G06F 1/3278 713/310 |
| 8,406,128 | B1 | 3/2013 | Brar et al. |
| 8,570,865 | B2 | 10/2013 | Goldenberg et al. |
| 8,601,297 | B1 | 12/2013 | Abts et al. |
| 8,904,077 | B1 | 12/2014 | Alston |
| 9,106,387 | B2 | 8/2015 | Goldenberg et al. |
| 2002/0001305 | A1 | 1/2002 | Hughes et al. |
| 2003/0148801 | A1 * | 8/2003 | Deyring ............... G06F 1/24 455/701 |
| 2003/0179709 | A1 * | 9/2003 | Huff ............... H04L 12/28 370/248 |
| 2003/0179771 | A1 * | 9/2003 | Chan ............... H04L 12/28 370/445 |
| 2004/0017815 | A1 * | 1/2004 | Huff ............... H04L 12/28 370/395.53 |
| 2004/0131065 | A1 | 7/2004 | Sandy et al. |
| 2004/0267481 | A1 * | 12/2004 | Resnick ............... G11C 29/26 702/117 |
| 2005/0018650 | A1 * | 1/2005 | Dropps ............... G06F 13/385 370/351 |
| 2005/0022065 | A1 * | 1/2005 | Dixon ............... G06F 11/106 714/42 |
| 2005/0220013 | A1 * | 10/2005 | Singh ............... H04L 12/64 370/230 |
| 2007/0150762 | A1 | 6/2007 | Sharma et al. |
| 2008/0175259 | A1 | 7/2008 | Chao et al. |
| 2008/0219268 | A1 | 9/2008 | Dennison |
| 2009/0108828 | A1 | 4/2009 | Edamula |
| 2009/0190600 | A1 * | 7/2009 | Akahane ............... H04L 12/66 370/400 |
| 2010/0265849 | A1 | 10/2010 | Harel |
| 2011/0173352 | A1 | 7/2011 | Sela et al. |
| 2011/0291703 | A1 * | 12/2011 | Lee ............... H03M 9/00 326/93 |
| 2012/0044948 | A1 * | 2/2012 | Nachum ............. H04L 12/4641 370/401 |
| 2012/0294314 | A1 | 11/2012 | Campbell et al. |
| 2013/0107716 | A1 | 5/2013 | Volpe et al. |
| 2013/0346653 | A1 | 12/2013 | Frekking et al. |
| 2014/0013144 | A1 * | 1/2014 | Nakagawa ............ G06F 1/3215 713/323 |
| 2014/0195833 | A1 | 7/2014 | Wang et al. |
| 2015/0124611 | A1 | 5/2015 | Attar et al. |
| 2015/0171892 | A1 * | 6/2015 | Yu ............... H03M 9/00 370/254 |
| 2016/0062943 | A1 | 3/2016 | Nikami et al. |
| 2017/0093631 | A1 | 3/2017 | Volpe et al. |
| 2017/0222686 | A1 * | 8/2017 | Khan ............... H04B 1/40 |
| 2017/0338840 | A1 * | 11/2017 | Mao ............... H02M 3/156 |

OTHER PUBLICATIONS

Leiserson, C., "Fat-trees: Universal Networks for Hardware Efficient Supercomputing", IEEE Transactions on Computers, vol. c-34, No. 10, pp. 892-901, Oct. 1985.

Chiaraviglio et al., "Energy-aware Backbone Networks: a Case Study", Proceedings of Green Communications Workshop in conjunction with IEEE ICC'09 (GreenComm09), Dresden, Germany, 5 pages, Jun. 2009.

Chiaraviglio et al., "Energy-Aware UMTS Core Network Design", Proceedings of 1st International Workshop on Green Wireless (WGREEN 2008) in conjunction with WPMC, Lapland, Finland, 5 pages, Sep. 2008.

Chiaraviglio et al., "Reducing Power Consumption in Backbone Networks", Proceedings of 2009 IEEE International Conference on Communications (ICC 2009), Dresden, Germany, 6 pages, Jun. 2009.

Ohring et al., "On Generalized Fat Trees", Proceedings of the 9th International Parallel Processing Symposium, pp. 37-44, Santa Barbara, Apr. 25-28, 1995.

Restrepo et al., "Energy Profile Aware Routing", Proceedings of Green Communications Workshop in conjunction with IEEE ICC'09 (GreenComm09), Dresden, Germany, 5 pages, Jun. 2009.

Tucker et al., "Energy Consumption in IP Networks", Proceedings of 34th European Conference & Exhibition on Optical Common, (ECOC 2008), vol. 2-73, Brussels, Belgium, 1 page, Sep. 21-25, 2008.

Zahavi, E., "D-Mod-K Routing Providing Non-Blocking Traffic for Shift Permutations on Real Life Fat Trees", CCIT Technical Report # 776, Technion—Israel Institute of Technology, Haifa, Israel, 7 pages, Aug. 16, 2010.

Clos, Charles, "A Study of Non-Blocking Switching Networks", Bell System Technical Journal 32, pp. 406-424, Mar. 1953.

Mellanox Technologies Inc., "Scaling 10Gb/s Clustering at Wire-Speed", Santa Clara, California, USA, 8 pages, 2006.

IEEE 802.1D Standard "IEEE Standard for Local and Metropolitan Area Networks—Media Access Control (MAC) Bridges", IEEE Computer Society, USA, 281 pages, Jun. 9, 2004.

IEEE 802.1AX Standard "IEEE Standard for Local and Metropolitan Area Networks—Link Aggregation", IEEE Computer Society, USA, 163 pages, Nov. 3, 2008.

Turner et al., "Multirate Clos Networks", IEEE Communications Magazine, 11 pages, Oct. 2003.

Thayer School of Engineering, "An Slightly Edited Local Copy of Elements of Lectures 4 and 5", Dartmouth College, 5 pages, Jan. 15, 1998 http://people.seas.harvard.edu/~jones/cscie129/nu_lectures/lecture11/switching/clos_network/clos_network.html.

Mula et al., U.S. Appl. No. 15/401,042, filed Jan. 8, 2017.

802.3ba-2010—IEEE Standard for Information technology—Local and metropolitan area networks—Specific requirements—Part 3: CSMA/CD Access Method and Physical Layer Specifications Amendment 4: Media Access Control Parameters, Physical Layers, and Management Parameters for 40 Gb/s and 100 Gb/s Operation, 457 pages, Jun. 22, 2010.

U.S. Appl. No. 15/401,042 office action dated Aug. 27, 2018.

U.S. Appl. No. 15/401,042 office action dated Dec. 13, 2018.

* cited by examiner

POWER-EFFICIENT ACTIVATION OF MULTI-LANE PORTS IN A NETWORK ELEMENT

TECHNICAL FIELD

Embodiments described herein relate generally to data communication, and particularly to methods and systems for power-efficient activation of multi-lane ports in a network element.

BACKGROUND

In various communication networks, network elements such as a switch, router or Network Interface Controller (NIC), interconnect using ports. Each port comprises one or more Serializer/Deserializer (SERDES) devices for serially transmitting and receiving traffic to and from the communication network via respective physical lanes.

Network elements having multi-lane ports are known in the art. For example, U.S. Pat. No. 8,601,297 describes energy proportional solutions for computer networks such as data centers. Congestion sensing heuristics are used to adaptively route traffic across links. Traffic intensity is sensed and links are dynamically activated as they are needed. As the offered load is decreased, the lower channel utilization is sensed and the link speed is reduced to save power. Flattened butterfly topologies can be used in a further power saving approach. Switch mechanisms exploit the topology's capabilities by reconfiguring link speeds on-the-fly to match bandwidth and power with the traffic demand. For instance, the system may estimate the future bandwidth needs of each link and reconfigure its data rate to meet those requirements while consuming less power. In one configuration, a mechanism is provided where the switch tracks the utilization of each of its links over an epoch, and then makes an adjustment at the end of the epoch.

Multi-lane ports for 40 Gbps and 100 Gbps are specified, for example, in "802.3ba-2010—IEEE Standard for Information technology—Local and metropolitan area networks—Specific requirements—Part 3: CSMA/CD Access Method and Physical Layer Specifications Amendment 4: Media Access Control Parameters, Physical Layers, and Management Parameters for 40 Gb/s and 100 Gb/s Operation," Jun. 22, 2010, which is incorporated herein by reference.

SUMMARY

An embodiment that is described herein provides a network element that includes circuitry and multiple ports. The ports are configured to transmit packets to a common destination via multiple paths of a communication network. Each port includes multiple serializers that serially transmit the packets over respective physical lanes. The power consumed by each port is a nonlinear function of the number of serializers activated in the port. The circuitry is configured to select one or more serializers among the ports to (i) meet a throughput demand via the ports and (ii) minimize an overall power consumed by the ports under a constraint of the nonlinear function, and to activate only the selected serializers. The circuitry is configured to choose for a packet received in the network element and destined to the common destination a port in which at least one of the serializers is activated, and to transmit the packet to the common destination via the chosen port.

In some embodiments, in accordance with the nonlinear function, the power consumption of a single active serializer in a given port is higher than the power consumption of any additional active serializer of the given port. In other embodiments, the circuitry is configured to select the one or more serializes so that a number of ports among the multiple ports having one or more activated serializers is minimal. In yet other embodiments, the circuitry is configured to select the one or more serializers so that a number of ports among the multiple ports having all of their serializers activated is maximal.

In an embodiment, the circuitry is configured to select the one or more serializers by selecting to activate at least one serializer in each of the multiple ports. In another embodiment, the circuitry is configured to select two or more serializers in at least one of the multiple ports only when the throughput demand is higher than a throughput achievable by activating a single serializer in each of the multiple ports. In yet another embodiment, the circuitry is configured to activate a serializer, in addition to one or more serializers that are already activated in respective ports, in a port that already has an activated serializer prior to a port that has no activated serializers.

In some embodiments, the circuitry is configured to de-activate a serializer in a port having a single activated serializer prior to a port having two or more activated serializers. In other embodiments, the circuitry is configured to choose the port for the packet received so that load is distributed among the multiple ports in accordance with the respective number of activated serializers. In yet other embodiments, the circuitry is configured to choose the port for the packet received by monitoring bandwidth utilization of one or more of the multiple ports, and choosing the port based on the bandwidth utilization.

There is additionally provided, in accordance with an embodiment that is described herein, a method, including, in a network element that includes multiple ports for transmitting packets to a common destination via multiple respective paths of a communication network, each port includes multiple serializers that serially transmit the packets over respective physical lanes, and a power consumed by each of the multiple ports is a nonlinear function of a number of the serializers activated in the port, selecting one or more serializers among the multiple ports to (i) meet a throughput demand via the multiple ports and (ii) minimize an overall power consumed by the multiple ports under a constraint of the nonlinear function, and activate only the selected serializers. A port is chosen from among the multiple ports in which at least one of the serializers is activated, for a packet received in the network element and destined to the common destination, and the packet is transmitted to the common destination via the chosen port.

These and other embodiments will be more fully understood from the following detailed description of the embodiments thereof, taken together with the drawings in which:

DETAILED DESCRIPTION OF EMBODIMENTS

Overview

Figure 1:
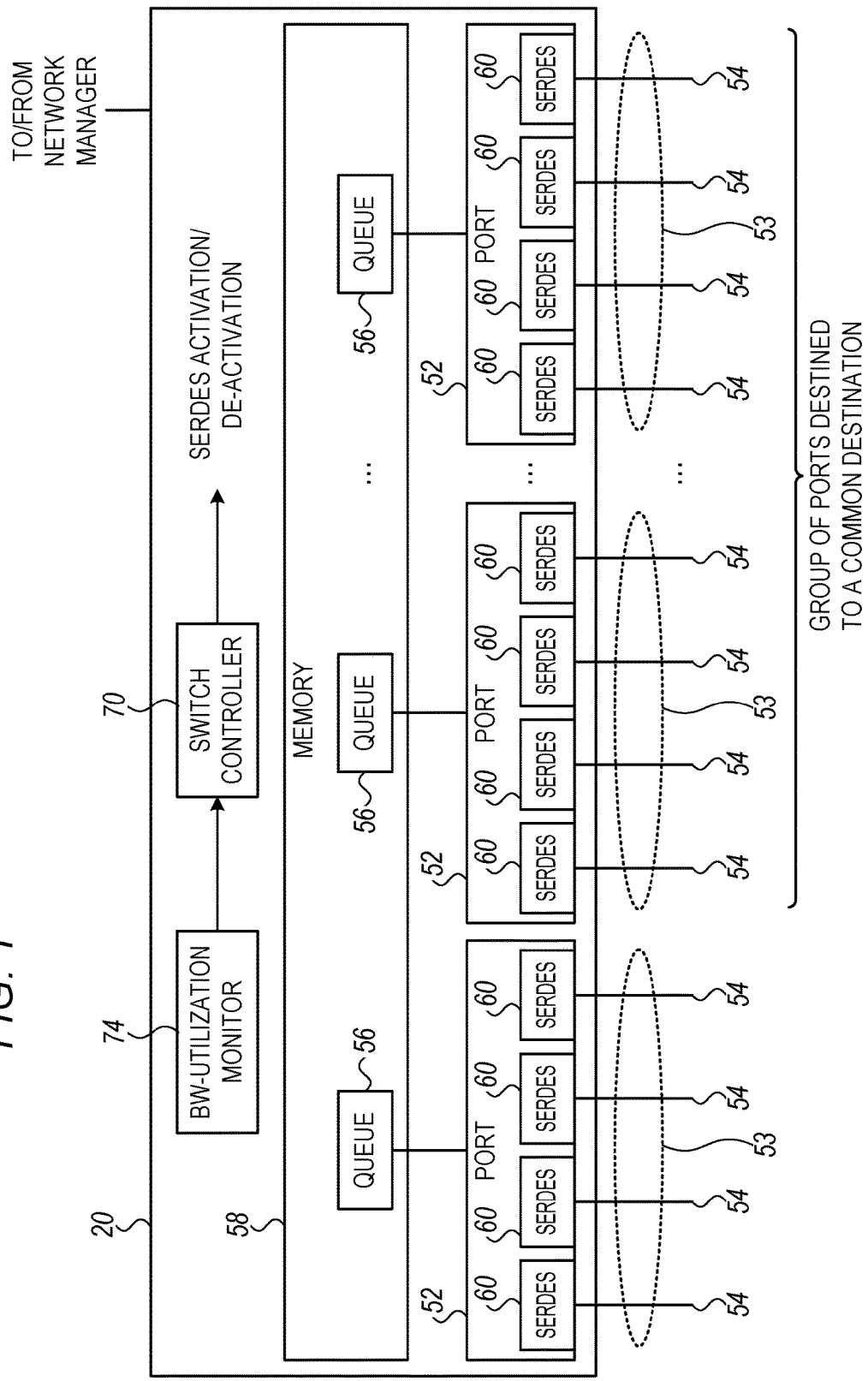
FIG. 1 is a block diagram that schematically illustrates a network element having multi-lane ports, in accordance with an embodiment that is described herein.

A multi-lane port that connects to a communication network using N physical lanes typically supports a maximal transmission rate that is N times higher than that of a single-lane port. Network elements that employ multi-lane ports include, for example, switches and routers that build-up the communication network fabric, and Network Interface Controllers (NICs) that serve for connecting end nodes to the communication network fabric.

For each lane, the port typically comprises a dedicated Serializer/Deserializer (SERDES) that serially transmits data to the communication network and receives data from the communication network via its respective lane. Being the highest-clock-rate devices in the network element, the power consumed by the SERDES(s) may amount to a significant portion of the total power consumed by the network element.

Embodiments that are described herein provide improved methods and systems for power-efficient activation of multi-lane ports in a network element. In the disclosed techniques, the network element comprises a controller that, among other functions, is capable of activating and de-activating each of the SERDES(s) in a multi-lane port separately. When activated, the SERDES consumes a certain amount of power and is operational for communication. When de-activated, the SERDES consumes little or no power, and is non-operational for communication. In the disclosed techniques the network element activates only a partial subset of the available SERDES(s) to reduce power consumption when operating at a reduced traffic load, as will be described in detail below.

In some embodiments, the power consumed by a port is a nonlinear function of the number of SERDES(s) activated in that port. Consider an example nonlinear dependency, in which the amount of power consumed when a single SERDES is active in a port is higher than the additional amount of power consumed by each additional SERDES when active in the same port.

A dependency of this sort implies that, given a number Ns of SERDES(s) to be activated (e.g., to handle certain traffic load), minimizing the overall power consumption can be achieved by activating these Ns SERDES(s) within a minimal number of ports. For example, when activating six SERDES(s) in a group of four 4-lane ports, minimal power consumption results by activating four SERDES(s) in one port and two SERDES(s) in another port. In this case, these two ports are configured to different respective bandwidths. Alternatively, the same minimal amount of power will be consumed by activating three SERDES(s) in two selected ports. In this case, both ports are configured to the same bandwidth. Any other combination for activating six SERDES(s) within the four ports results in activating SERDES(s) in more than two ports, which is suboptimal. In general, flexibly configuring multiple ports to possibly different respective bandwidths may assist in reducing the overall power consumption.

Assume now that to meet given throughput requirements, the network element needs to activate Ns SERDES(s) within a group of multiple N-lane ports. In an embodiment, when Ns≤N, the network element activates Ns SERDES(s) within a single port. Otherwise, N<Ns, and the network element activates all N SERDES(s) in one or more ports and possibly up to (N−1) SERDES(s) in one additional port. In these embodiments, the Ns SERDES(s) are activated within the multiple ports so that the number of ports having all of their SERDES(s) activated is maximal.

In some embodiments, e.g., for supporting high throughput, the network element defines a port-group of multiple ports, each of which is configured to transmit packets to a common target destination via multiple respective paths over the communication network. A port-group of this sort can be defined, for example, at the data link layer or network layer (OSI layer 2 and layer 3, respectively).

In some embodiments, the network element cyclically adjusts its throughput requirements according to varying network conditions, and adaptively activates or de-activates SERDES(s) across the port-group so as to meet throughput demands while consuming minimal power.

In some embodiments, activating a first SERDES in a port whose entire SERDES(s) are inactive involves executing a power-up sequence that is unacceptably long. In such embodiments, the network element keeps at least one SERDES active in each of the ports in the port-group at all times. Moreover, the network element activates a number of SERDES(s) larger than the number of ports in the port-group only when necessary for handling the required throughput.

In an embodiment, the network element distributes packets destined to the common target destination via the ports of the port-group so that a port having a larger number of activated SERDES(s) typically gets a larger portion of the traffic. The network element senses the loads experienced by the ports, and adjusts the traffic distribution among the ports accordingly.

Although the ports exhibit a nonlinear dependency between the power consumption and number of SERDES(s) activated in the port, by using the disclosed techniques, the dependency between the overall power consumption and the traffic load via the port-group is close to linear.

System Description

FIG. 1 is a block diagram that schematically illustrates a network element 20 having multi-lane ports, in accordance with an embodiment that is described herein. In the present example, network element 20 comprises a network switch, also referred to simply as "switch," for brevity. Alternatively, network element 20 may comprise a router, bridge, Network Interface Controller (NIC) or any other suitable network element that connects to a communication network.

Switch 20 comprises one or more ports 52, each of which transmits and/or receives data via a respective link 53, which comprises a plurality of physical lanes 54. In the example of FIG. 1, each port 52 connects to a link having four lanes 54. Lane 54 may comprise, for example, a single or differential line (e.g., a copper wire) over which data is transmitted serially. Alternatively, lane 54 may comprise an optical fiber.

Network elements comprising multi-lane ports such as ports 52 can be used in various types of communication networks such as Ethernet or InfiniBand networks, and in various applications such as data centers and parallel computing. For example, ports 52 may be coupled to an Ethernet fabric, for which the bandwidth configurations supported by the Ethernet standard comprise 40 Gbps, 100 Gbps, 200 Gbps and 400 Gbps, (four lanes per port, each lane supporting 10 Gbps, 25 Gbps, 50 Gbps and 100 Gbps, respectively). Alternatively, non-standard Ethernet configurations can also be used. In InfiniBand fabric, the link speed of a single lane is typically a little higher than 10 Gbps. The principles of the invention are applicable, however, mutatis mutandis, to other suitable fabrics and speeds, and to ports having different suitable numbers of lanes.

Each of the ports 52 has a respective data queue 56, all of which are implemented as buffers in a memory 58. Memory 58 may comprise a Random Access Memory (RAM), or any memory of any suitable technology. In some embodiments, queues 56 comprise a shared buffer. Each of queues 56 serves multiple Serializer/Deserializer (SERDES) devices 60, e.g., four SERDES(s) per port, in the example of FIG. 1. A queue 56 may function as an ingress queue for storing packets received from the communication network, egress queue for storing packets to be transmitted to the communication network, or both.

Each of lanes 54 is connected to a respective SERDES 60, which can be separately configured as operational (activated) or non-operational (de-activated), independently of the other SERDES(s) in the port.

Switch 20 comprises a switch controller 70 that manages various functions of the switch. Among other tasks, switch controller 70 configures the routing of packets received in the switch via one or more ports, to respective ports for transmission. Routing received packets to ports for transmission can be implemented within the switch using any suitable routing method, such as, for example, using a configurable routing table or one or more routing rules (not shown).

In the example of FIG. 1, the switch controller configures a group of multiple ports, each having a different path via the communication network to a common destination. The switch may transmit a packet destined to this common destination via each of the ports in the group. As such, the group of ports supports a higher throughput toward the common destination than would have been possible using a single port. In some embodiments, the packets destined to the common destination are distributed among the ports of the group proportionally to the respective ports capacities, wherein the capacity of a port is determined by the number of SERDES(s) activated in the port.

Note that unlike hashing-based distribution methods that are sometimes used in protocols such as the Link Aggregation Group (LAG) protocol in OSI layer 2, and the Equal-Cost Multi-Path (ECMP) protocol in OSI layer 3, in some disclosed embodiments, the network element distributes the packets to be transmitted to the network based on monitoring the ports loads.

Switch controller 70 can separately activate or de-activate each SERDES 60. In the context of the present patent application and in the claims, the term "de-activating a SERDES" means that the corresponding lane is not used for communicating data, at least temporarily, and therefore the SERDES can be powered down. (i.e., held in a low-power "sleep" state or powered off entirely). Similarly, in the context of the present patent application and in the claims the term "activating a SERDES" means that the corresponding lane is required for communicating data, and therefore the SERDES needs to be powered to become operational. In some embodiments, SERDES 60 can be activated (i.e., powered to an operational state) for one direction (transmit or receive) and de-activated (shut down to a non-operational state) in the other direction.

As noted above, SERDES 60 typically comprises both a serializer for transmission and a deserializer for reception, wherein the serializer and deserializer can each be activated or de-activated independently from one another. In the context of the present disclosure and in the claims, since we refer mainly to the outbound direction, the terms "SERDES" and "serializer" are sometimes used interchangeably.

The ability to activate only part of the SERDES(s) allows the switch to efficiently manage the power consumption. Consider a 4-lane port, wherein each lane transmits up to a quarter of the maximal throughput of the port. In this example, for throughput ranges [0-25%], [25%-50%], [50%-75%] and [75%-100%], the switch can activate respective numbers of SERDES(s) 1, 2, 3, and 4. This approach can therefore be used for reducing power consumed by a port that communicates data at a throughput lower than the port's maximal throughput.

Methods for selective activation of SERDES(s) are described further in U.S. patent application Ser. No. 15/401, 042, filed Jan. 8, 2017, whose disclosure is incorporated herein by reference. In the disclosed techniques, selecting the number of SERDES(s) to activate in a port-group of a network element takes into consideration a nonlinear dependency between the number of active SERDES(s) in a port and the power consumed by that port, as will be described below.

In the embodiments disclosed herein, the power consumed by port 52 is a nonlinear function of the number of activated SERDES(s). In an example embodiment, the power consumed by port 52 when activating a single SERDES, is higher than the additional power consumed by the port due to activating each additional SERDES. Consider a 4-lane port that consumes zero power when all of its SERDES(s) are de-activated and power level "P" when all of its SERDES(s) are activated. In an example embodiment, in activating a single SERDES, the power consumed by the port is P/2, and in activating each additional SERDES, the additional power consumed by the port is (P/2)/3=P/6. In this example, the nonlinear dependency between power and number of activated SERDES(s) is specified in Table 1:

TABLE 1

Port power consumption as a function of the number of activated SERDES(s) in the port

| | Number of activated SERDES(s) | | | | |
|---|---|---|---|---|---|
| | 0 | 1 | 2 | 3 | 4 |
| Power consumed by the port | 0 | P · (1/2) | P · (2/3) | P · (5/6) | P |
| Power consumption increment | NA | p/2 | P/6 | P/6 | P/6 |

In the context of the present disclosure, a phrasing such as "the power consumed in activating a SERDES" refers to the amount of power consumed by the SERDES when up and active, and not to the power consumed by the actual activation operation.

Switch 20 comprises a bandwidth-utilization monitor 74 that measures the bandwidth utilization of ports 52. Bandwidth-utilization monitor 74 cyclically monitors certain attribute of queues 56, such as occupancy and/or filling and emptying rates to evaluate the bandwidth utilization of the ports.

In some embodiments, bandwidth-utilization monitor 74 assists switch controller 70 in determining updated throughput requirements over the group of ports. Alternatively or additionally, the switch controller receives updated throughput requirements for the group of ports from an external network manager (not shown), which has a wide view of the communication network activity and assigns throughput requirements to one or more network elements.

The configuration of switch 20 shown in FIG. 1 is an example configuration, which is chosen purely for the sake of conceptual clarity. In alternative embodiments, any other suitable switch configuration can be used. Some elements of switch 20, such as switch controller 70 and bandwidth-utilization monitor 74, may be implemented in hardware, e.g., in one or more Application-Specific Integrated Circuits (ASICs) or Field-Programmable Gate Arrays (FPGAs). Additionally or alternatively, some switch elements can be implemented using software, or using a combination of hardware and software elements. Memory 58 may be implemented using any suitable memory, such as Random Access Memory (RAM).

In some embodiments, some of the functions of switch may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the context of the present patent application and in the claims, the term "circuitry" refers to all the elements of switch 20 excluding ports 52 with their SERDES(s) 60. In FIG. 1, the circuitry comprises memory including queues 56, switch controller 70 and bandwidth-utilization monitor 74.

Power-Efficient Activation of Multi-Lane Ports

Figure 2:
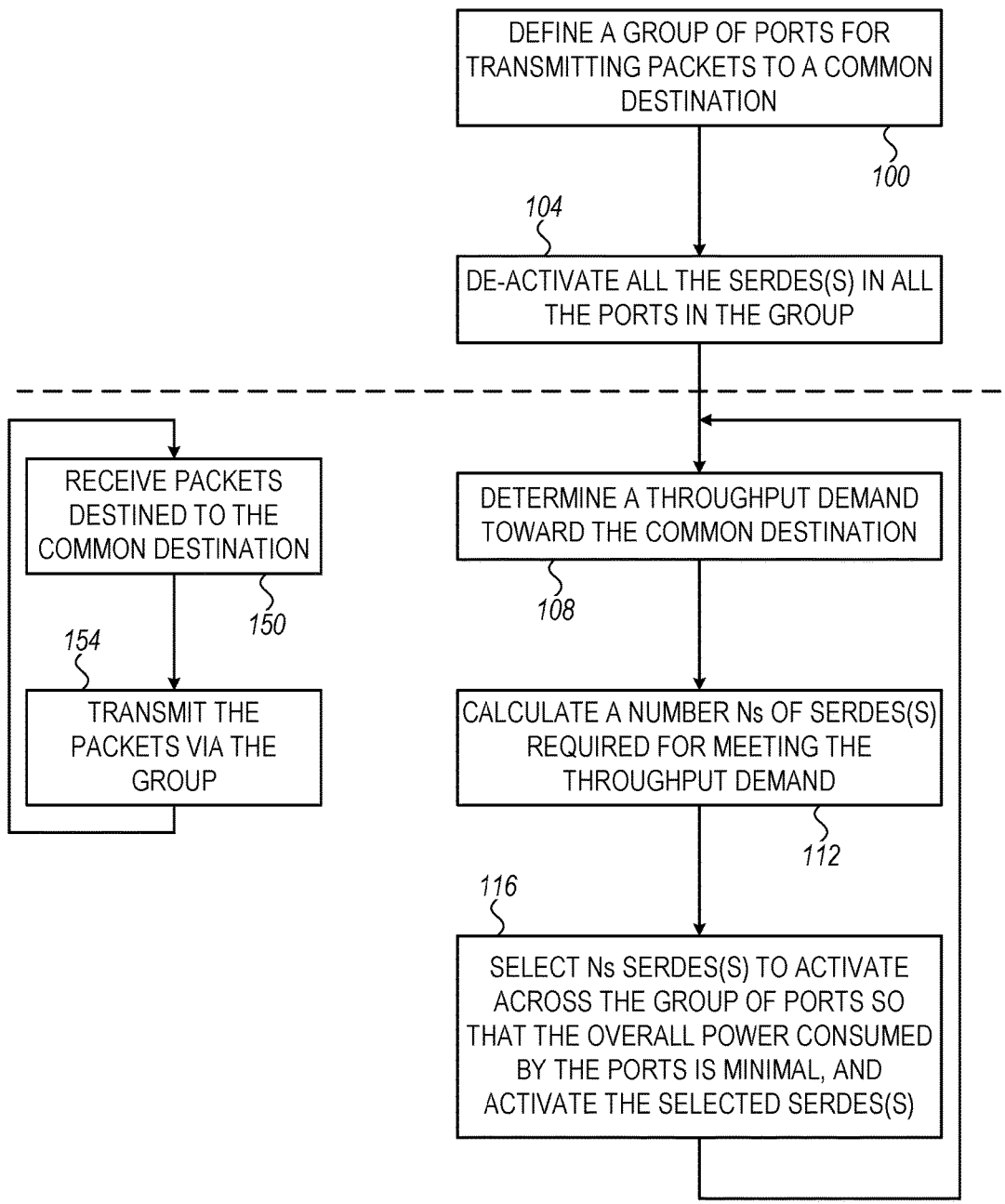
FIG. 2 is a flow chart that schematically illustrates a method for power-efficient activation of multi-lane ports in a network switch, in accordance with an embodiment that is described herein.

FIG. 2 is a flow chart that schematically illustrates a method for power-efficient activation of multi-lane ports in network switch 20, in accordance with an embodiment that is described herein. In the present example, the method is described as being executed by switch controller 70 as well as by other elements of switch 20.

The method begins with switch controller 70 defining a port-group comprising multiple ports 52 of the switch, at a group definition step 100. The multiple ports together meet a maximal throughput required, for example, in certain high-speed networks. All of the ports of the port-group defined at step 100 route to a common destination over the communication network via different respective paths. The common destination may be, for example, a computing node, server or any other suitable end node connected to the communication network. Alternatively, the destination may be an aggregation point in the network, in which traffic from multiple sources is aggregated and transmitted to some end point or to another aggregation point in the network over a single path or over multiple paths. At a port initialization step 104, the switch controller de-activates all of the SERDES(s) in the ports belonging to the port-group defined at step 100.

At a throughput determination step 108, the switch controller determines the overall throughput required via the port-group toward the common destination. The switch controller may receive the throughput requirement from an external network manager. Alternatively or additionally, the switch controller determines updated throughput requirements as indicated by bandwidth-utilization monitor 74, as described above.

At a number of SERDES(s) calculation step 112, the switch controller calculates the total number of SERDES(s) required for meeting the throughput demand of step 108. Let SERDES_TR and TOTAL_TR respectively denote a single SERDES throughput and the overall throughput required. In an embodiment, the number of SERDES(s) "Ns" is given by:

$$Ns = \text{FLOOR}[1+(\text{TOTAL\_TR}/\text{SERDES\_TR})] \qquad \text{Equation 1:}$$

For example, assuming SERDES(s) of 10 Gbps, and a total throughput of 52 Gbps, the number of SERDES(s) is Ns=6. Note that at step 112 the switch controller does not specify how to distribute the Ns SERDES(s) to be activated among the ports of the port-group.

At a port activation step 116, the switch controller activates a number Ns of SERDES(s) across the ports of the port-group defined at step 100. The switch controller selects a best combination of activating the Ns SERDES(s) among the ports of the port-group, so that the overall power consumed by the ports in the port-group is minimal compared to all possible such combinations.

In some embodiments, the combination specifies the number of SERDES(s) to be activated in each of the ports of the port-group. Alternatively, the combination specifies only those ports in which at least one SERDES will be activated, and the number of SERDES(s) to activate in each of these ports. In selecting the best combination of activated SERDES(s) among the ports, which results in minimal power consumption, the switch controller takes into account the nonlinear dependency of the power consumption on the number of SERDES(s) activated in each port, as will be described in detail below.

As noted above, a criterion for minimizing the power consumption requires that the number of ports in which at least one SERDES is activated should be minimized. In some embodiments, this criterion is fulfilled by activating the ports to their maximal capabilities, whenever possible, in which case the switch controller selects the best combination using the following scheme:

If the required throughput can be handled by a single port, i.e., Ns≤N, wherein "N" denotes the number of SERDES(s) per port, the switch controller selects a single port of the port-group and activates a number of Ns SERDES(s) in the selected port.

Otherwise a single port is insufficient to meet the throughput demand. In this case:
If Ns is an integer multiple of N, i.e., Ns=Q·N, wherein Q is a positive integer, the switch controller selects a number Q=(Ns/N) of ports in which all the N SERDES(s) will be activated.
If dividing Ns by N results in a quotient Q and a reminder R, wherein 0<Q and 1≤R≤N−1 are integers, the switch controller selects (Q+1) ports of the port-group, wherein in Q of these ports all of the N SERDES(s) will be activated, and in one port only R SERDES(s) will be activated.

The switch controller activates only the Ns selected SERDES(s) and de-activates all other SERDES(s) in the ports of the port-group. Embodiments in which at least one SERDES remains active in each of the ports are described below.

According to the above scheme, the switch controller activates all the SERDES(s) in a maximal possible number of ports. As an example, in activating 11 SERDES(s) over a group of five 4-lane ports, two of the five ports activate all of their four SERDES(s) and another port activates three out of its four SERDES(s). All of the remaining 9 SERDES(s) in the port-group are de-activated.

Following step 116 the method loops back to step 108, to update the throughput demand. Typically, the switch controller carries out the loop over steps 108, 112 and 116 cyclically, and recalculates Ns to accommodate changing conditions in the communication network. Based on updated Ns values, the switch controller adaptively activates and de-activates SERDES(s) in the ports of the port-group to minimize the power consumed by the ports of the port-group. The switch controller activates the minimal number of SERDES(s) required to meet updated throughput demands, and selects in which ports to activate the SERDES(s) so as to minimize the power consumption, as described above.

The left part of FIG. 2 depicts additional steps of the method that are typically carried out in parallel to the loop of steps 108, 112 and 116 above. At a reception step 150, the switch controller receives one or more packets destined to the common destination, and stores each of these packets in one of queues 56. In some embodiments, the switch controller distributes the received packets over queues 56 that are associated with the ports of the port-group so as to balance the load among the ports in accordance with the number of SERDES(s) activated in each port.

In some embodiments, distributing the packets among the ports is carried out by a load balancer or distributor (not shown), which is unaware of the actual number of SERDES(s) that are active in each port. In such embodiments, the distributor senses the load experienced by the ports (e.g., using BW-utilization monitor 74), and selects for the packet a port experiencing a lower load compared to one or more other ports. Such a load balancing approach is sometimes used in adaptive routing methods.

At a transmission step 154, the switch controller forwards packets from queues 56 that are associated with the ports assigned to the port-group for transmission via the ports toward the common destination. Following step 154 the method loops back to step 150 for receiving subsequent packets.

In some embodiments, de-activating all of the SERDES(s) of a port is undesirable, because re-powering the port involves executing a power-up sequence that delays the time at which the port becomes usable for communication, and may even result in packet drop. In such embodiments, the switch controller initially activates one SERDES in each of the ports of the port-group, i.e., Ng SERDES(s) for a port-group of Ng ports. The switch controller then:

Activates Ng SERDES(s), one SERDES per each of the Ng ports, when the throughput demand is up to Ng·SERDES_TR (i.e., Ns≤Ng), wherein SERDES_TR denotes the maximal throughput of a single SERDES.

Activates more than Ng SERDES(s) only when the throughput demand exceeds Ng·SERDES_TR (i.e., Ng<Ns).

Figure 3:
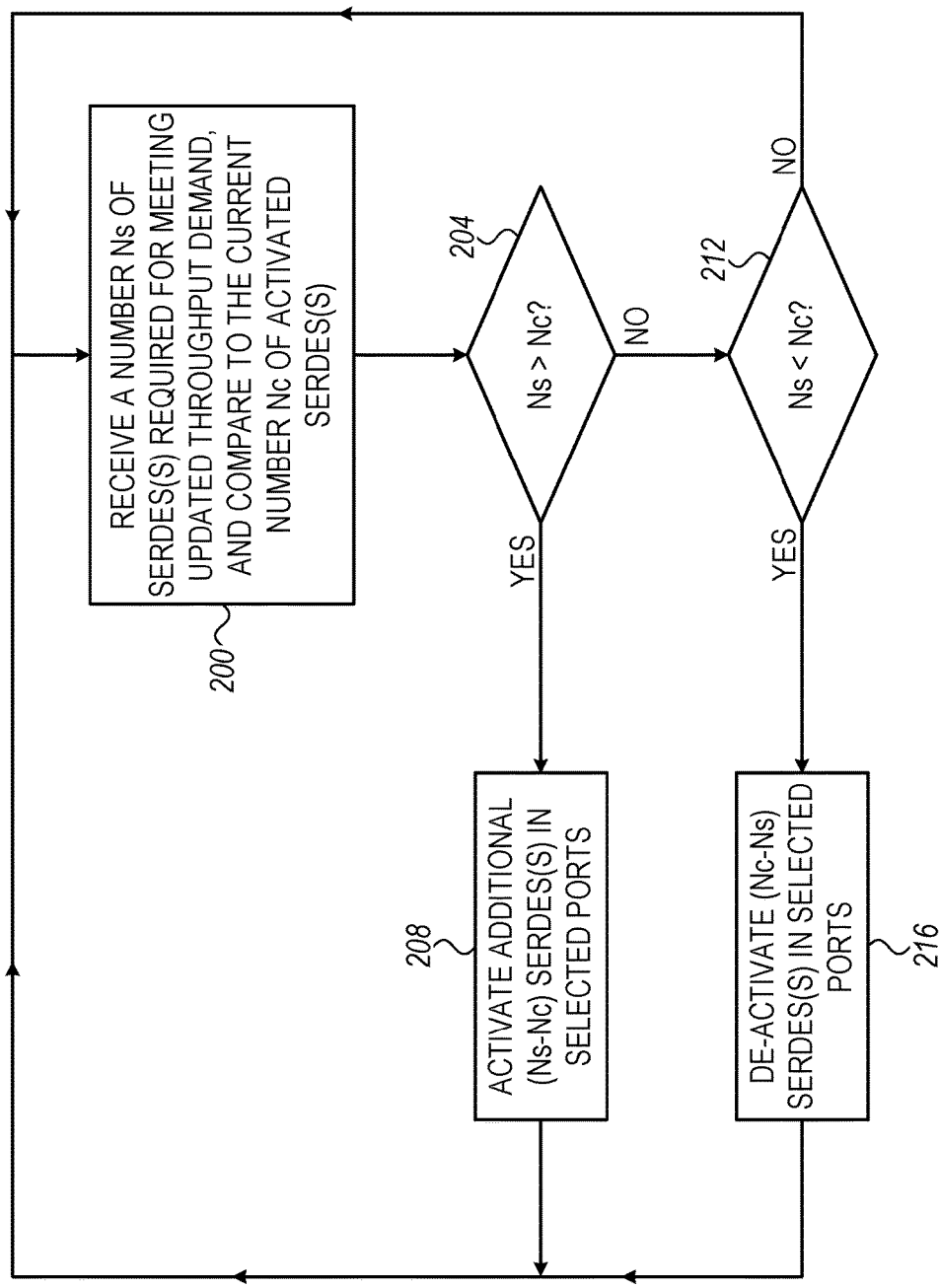
FIG. 3 is a flow chart that schematically illustrates a method for adaptive activation and de-activation of Serializer/Deserializer (SERDES) devices in selected ports, in accordance with an embodiment that is described herein.

FIG. 3 is a flow chart that schematically illustrates a method for adaptive activation and de-activation of Serializer/Deserializer (SERDES) devices in selected ports, in accordance with an embodiment that is described herein. The method of FIG. 3 can be executed, for example, as part of step 116 of the method described in FIG. 2 above.

At a throughput requirement reception step 200, the switch controller receives a number Ns of SERDES(s) to activate, which represents updated an throughput requirement. Ns can be determined, for example, as described at step 112 of the method of FIG. 2 above.

At a first comparison step 204, the switch controller checks whether Ns is larger than the current number of activated SERDES(s), which is denoted "Nc." When at step 204 Ns>Nc, the switch controller proceeds to an activation step 208 to activate additional (Ns-Nc) SERDES(s). In some embodiments, the switch controller first attempts to assign the additional SERDES(s) to ports that already have at least one SERDES activated, and only then to ports whose entire SERDES(s) are de-activated. Such activation scheme avoids activating a single SERDES in the ports, whenever possible, and therefore reduces the overall power consumption. The switch controller then activates the selected SERDES(s) and loops back to step 200 to receive an updated throughput requirement.

If at step 204 Ns is not larger than Nc, the switch controller proceeds to a second comparison step 212, to checks whether Ns is smaller than Nc. If at step 212 Ns<Nc the switch controller proceeds to a de-activation step 216. Otherwise, Ns=Nc, i.e., the number of SERDES(s) currently activated is adequate for handling the throughput requirement, and the switch controller loops back to step 200 to receive an updated throughput requirement.

At step 216, the switch controller de-activates a number (Nc−Ns) of SERDES(s). In some embodiments, the switch controller selects ports in which to de-activate SERDES(s) according to a descending order of the number of occupied SERDES(s). In other words, the switch controller selects for de-activation ports having the smallest number of activated SERDES(s) with higher priority.

This de-activation scheme increases the probability of de-activating an entire port, therefore reducing the power consumption. In an example embodiment, the switch controller selects to de-activate a SERDES in a port having a single activated SERDES prior to a port having two or more activated SERDES(s). The switch controller then de-activates the selected SERDES(s), and loops back to step 200 to receive updated throughput requirement.

Note that in general, the number of SERDES(s) active in a port determines its power consumption, and not the identities of the specific SERDES(s) within the port. For example, the port consumes the same amount of power when any of its SERDES(s) is active alone.

Next we compare the performance of the disclosed embodiments to the performance of an alternative solution in which all the ports in the port-group are configured to the same transmission speed. Such a solution can be implemented, for example, in combination with applying Equal-Cost Multi-Path routing (ECMP). In the comparison below we assume a port-group of Ng ports, each port comprising four SERDES(s). The methods to be compared are summarized as follows:

METHOD_1—Activating SERDES(s) for minimal power consumption, wherein de-activating all of the SERDES(s) in a port is allowed.

METHOD_2—Activating SERDES(s) for minimal power consumption, wherein each port has at least one SERDES activated at all times.

METHOD_3—Activating the same number of SERDES(s) (i.e., same transmission speed) in all ports.

In METHOD_1 and METHOD_2 above, different ports may be configured to different bandwidths, whereas in METHOD_3 all the ports are configured to the same bandwidth.

Note that in METHOD_1, to handle a certain traffic load of X %, the number of ports in which all the SERDES(s) are activated is X % (or approximately X %) of the number of ports in the port-group. Table 2 refers to a 25% traffic load over the port-group.

TABLE 2

Comparing power consumption at 25% load

|  | METHOD_1 | METHOD_2 | METHOD_3 |
|---|---|---|---|
| Number of ports having activated SERDES(s) | 25% of Ng | Ng | Ng |
| Number of SERDES(s) activated per port | 4 | 1 | 1 |
| Overall power consumption | 25% | 50% | 50% |

As seen in Table 2, at a 25% traffic load, the power consumption using METHOD_1 is 25%, whereas in METHOD_2 and METHOD_3 the power consumption is 50%. Under these conditions, METHOD_2 performs similar to METHOD_3. Table 3 refers to a 60% traffic load over the port-group.

TABLE 3

Comparing power consumption at 60% load

|  | METHOD_1 | METHOD_2 |  | METHOD_3 |
|---|---|---|---|---|
| Number of ports activated | 60% of Ng | Ng | 46% of Ng | Ng |
| Number of SERDES(s) activated per port | 4 | ≥1 | 4 | 3 |
| Overall power consumption | 60% | 73% |  | 83% |

At a 60% traffic load, the power consumption using METHOD_1, METHOD_2 and METHOD_3 is 60%, 73% and 83%, respectively. Again, METHOD_1 performs better than both METHOD_2 and METHOD_3. In this example, however, since METHOD_3 does not allow different ports operating at different speeds, METHOD_2 performs better than METHOD_3, in terms of power consumption.

The embodiments described above are given by way of example, and alternative suitable embodiments can also be used. For example, in the embodiments described we mainly assume that all of the ports in the port-group have the same number of SERDES(s), and are subject to the same or similar nonlinear dependency of power consumption vs. the number of activated SERDES(s). The disclosed embodiments, however, are applicable, mutatis mutandis, to ports having different respective numbers of lanes and power consumption vs. number of activated SERDES(s) dependencies. For example, the nonlinear dependency between the port power consumption and the number of activated SERDES(s) may vary within some predefined tolerance.

Although the embodiments described above were described with reference to switch 20, the methods can be similarly carried out in any suitable network element that connects to a communication network using multi-lane ports.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
   multiple ports, configured to transmit packets to a common destination via multiple respective paths of a communication network, wherein each port comprises multiple serializers that serially transmit the packets over respective physical lanes, wherein each of the multiple serializers in each port can be activated or de-activated independently of other serializers in the port, and wherein a power consumed by each of the multiple ports is a nonlinear function of a number of the serializers activated in the port; and
   circuitry, configured to:
   select one or more serializers among the multiple ports to (i) meet a throughput demand via the multiple ports and (ii) minimize an overall power consumed by the multiple ports under a constraint of the nonlinear function;
   activate only the selected serializers, and deactivate the serializers that are not selected; and
   choose for a packet, received in the network element and destined to the common destination, a port from among the multiple ports in which at least one of the serializers is activated, and transmit the packet to the common destination via the activated serializers in the chosen port.

2. The network element according to claim 1, wherein, in accordance with the nonlinear function, a power consumption of a single active serializer in a given port is higher than the power consumption of any additional active serializer of the given port.

3. The network element according to claim 2, wherein the circuitry is configured to select the one or more serializers so that a number of ports among the multiple ports having one or more activated serializers is minimal.

4. The network element according to claim 2, wherein the circuitry is configured to select the one or more serializers so that a number of ports among the multiple ports having all of their serializers activated is maximal.

5. The network element according to claim 1, wherein the circuitry is configured to select the one or more serializers by selecting to activate at least one serializer in each of the multiple ports.

6. The network element according to claim 5, wherein the circuitry is configured to select two or more serializers in at least one of the multiple ports only when the throughput demand is higher than a throughput achievable by activating a single serializer in each of the multiple ports.

7. The network element according to claim 1, wherein the circuitry is configured to activate a serializer, in addition to one or more serializers that are already activated in respective ports, in a port that already has an activated serializer prior to a port that has no activated serializers.

8. The network element according to claim 1, wherein the circuitry is configured to de-activate a serializer in a port having a single activated serializer prior to a port having two or more activated serializers.

9. The network element according to claim 1, wherein the circuitry is configured to choose the port for the packet received so that load is distributed among the multiple ports in accordance with the respective number of activated serializers.

10. The network element according to claim 9, wherein the circuitry is configured to choose the port for the packet received by monitoring bandwidth utilization of one or more of the multiple ports, and choosing the port based on the bandwidth utilization.

11. The network element according to claim 1, wherein the circuitry is configured to determine a number of serializers required for meeting the throughput demand, and then to select for activation the determined number of serializers across the ports, in a combination that minimizes the overall power consumed by the multiple ports.

12. A method, comprising:
in a network element that comprises multiple ports for transmitting packets to a common destination via multiple respective paths of a communication network, wherein each port comprises multiple serializers that serially transmit the packets over respective physical lanes, wherein each of the multiple serializers in each port can be activated or de-activated independently of other serializers in the port, and wherein a power consumed by each of the multiple ports is a nonlinear function of a number of the serializers activated in the port,
selecting one or more serializers among the multiple ports to (i) meet a throughput demand via the multiple ports and (ii) minimize an overall power consumed by the multiple ports under a constraint of the nonlinear function;
activating only the selected serializers, and deactivating the serializers that are not selected; and
choosing for a packet, received in the network element and destined to the common destination, a port from among the multiple ports in which at least one of the serializers is activated, and transmitting the packet to the common destination via the activated serializers in the chosen port.

13. The method according to claim 12, wherein in accordance with the nonlinear function, a power consumption of a single active serializer in a given port is higher than the power consumption of any additional active serializer of the given port.

14. The method according to claim 13, wherein selecting the one or more serializers comprises selecting the one or more serializers so that a number of ports among the multiple ports having one or more activated serializers is minimal.

15. The method according to claim 13, wherein selecting the one or more serializers comprises selecting the one or more serializers so that a number of ports among the multiple ports having all of their serializers activated is maximal.

16. The method according to claim 12, wherein selecting the one or more serializers comprises selecting to activate at least one serializer in each of the multiple ports.

17. The method according to claim 16, wherein selecting the one or more serializers comprises selecting two or more serializers in at least one of the multiple ports only when the throughput demand is higher than a throughput achievable by activating a single serializer in each of the multiple ports.

18. The method according to claim 12, wherein selecting the one or more serializers comprises activating a serializer, in addition to one or more serializers that are already activated in respective ports, in a port that already has an activated serializer prior to a port that has no activated serializers.

19. The method according to claim 12, wherein selecting the one or more serializers comprises de-activating a serializer in a port having a single activated serializer prior to a port having two or more activated serializers.

20. The method according to claim 12, wherein choosing the port for the packet received comprises choosing the port so that load is distributed among the multiple ports in accordance with the respective number of activated serializers.

21. The method according to claim 20, wherein choosing the port comprises monitoring bandwidth utilization of one or more of the multiple ports, and choosing the port based on the bandwidth utilization.

22. The method according to claim 12, wherein selecting the one or more serializers comprises determining a number of serializers required for meeting the throughput demand, and then selecting for activation the determined number of serializers across the ports, in a combination that minimizes the overall power consumed by the multiple ports.

* * * * *